United States Patent
Lecomte et al.

(10) Patent No.: US 6,277,352 B1
(45) Date of Patent: Aug. 21, 2001

(54) METHOD AND DEVICE FOR PROCESSING A GAS CONTAINING HYDROGEN SULFIDE AND SULFUR DIOXIDE, COMPRISING A STAGE OF REMOVAL OF SOLID BY-PRODUCTS

(75) Inventors: Fabrice Lecomte; Christian Streicher, both of Rueil-Malmaison; Daniel Benayoun, Sartrouville; Cecile Barrere-Tricca, Paris, all of (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/413,889

(22) Filed: Oct. 7, 1999

(30) Foreign Application Priority Data

Oct. 8, 1998 (FR) .................................. 98/12632

(51) Int. Cl.$^7$ .......................... B01D 53/50; B01D 53/52; C01B 17/04
(52) U.S. Cl. .................... 423/574.1; 423/575; 423/576.2
(58) Field of Search ................................. 423/575, 576.7, 423/576.2, 574.1

(56) References Cited

U.S. PATENT DOCUMENTS

| 4,565,678 | 1/1986 | Zielke et al. | 423/235 |
|---|---|---|---|
| 4,784,754 | 11/1988 | Fong et al. | 209/2 |
| 5,389,351 | 2/1995 | Hasbe et al. | 423/242.1 |
| 5,935,547 | * 8/1999 | Lecomte et al. | 423/575 |
| 5,951,961 | * 9/1999 | Viltard et al. | 423/575 |
| 6,063,357 | * 5/2000 | Boucot et al. | 423/575 |

FOREIGN PATENT DOCUMENTS

| 829452A1 | 3/1998 | (EP) . |
|---|---|---|
| 2735460 | 12/1996 | (FR) . |

OTHER PUBLICATIONS

Derwent English Abstract for Europe Patent Application No. 0 829 452 A1, Mar. 1998.*
Barthel et al The IFP Clauspol 1500 Process. Eight Years of Industrial Experience, Chem. Eng. Monogrm. 1979 10 69–86 Coden, Cenmdk XP002106750.

* cited by examiner

Primary Examiner—Steven P. Griffin
Assistant Examiner—Timothy C Vanoy
(74) Attorney, Agent, or Firm—Antonelli, Terry, Stout & Kraus, LLP

(57) ABSTRACT

A method for processing a gas containing at least hydrogen sulfide ($H_2S$) and at least sulfur dioxide ($SO_2$), includes the following stages: contacting the gas with a liquid solvent, such as polyethylene glycol, containing at least one catalyst, such as sodium salicylate, in a contacting stage, recovering a gaseous effluent substantially containing no hydrogen sulfide and no sulfur dioxide, and a mixture containing liquid sulfur, liquid solvent and solid by-products such as alkali metal or alkaline earth metal sulfates or thiosulfates, resulting from the degradation of the catalyst, separating the liquid sulfur from the liquid solvent in a decantation zone, extracting a liquid fraction F containing at least the solid by-products from a layer between the liquid solvent and the liquid sulfur in the decantation zone, sending the liquid fraction F to a processing stage distinct from the contacting stage, and recovering at least a stream F, comprising most of the solid by-products and a stream $F_2$ mostly comprising solvent nearly free of the solid by-products from the processing stage.

10 Claims, 2 Drawing Sheets

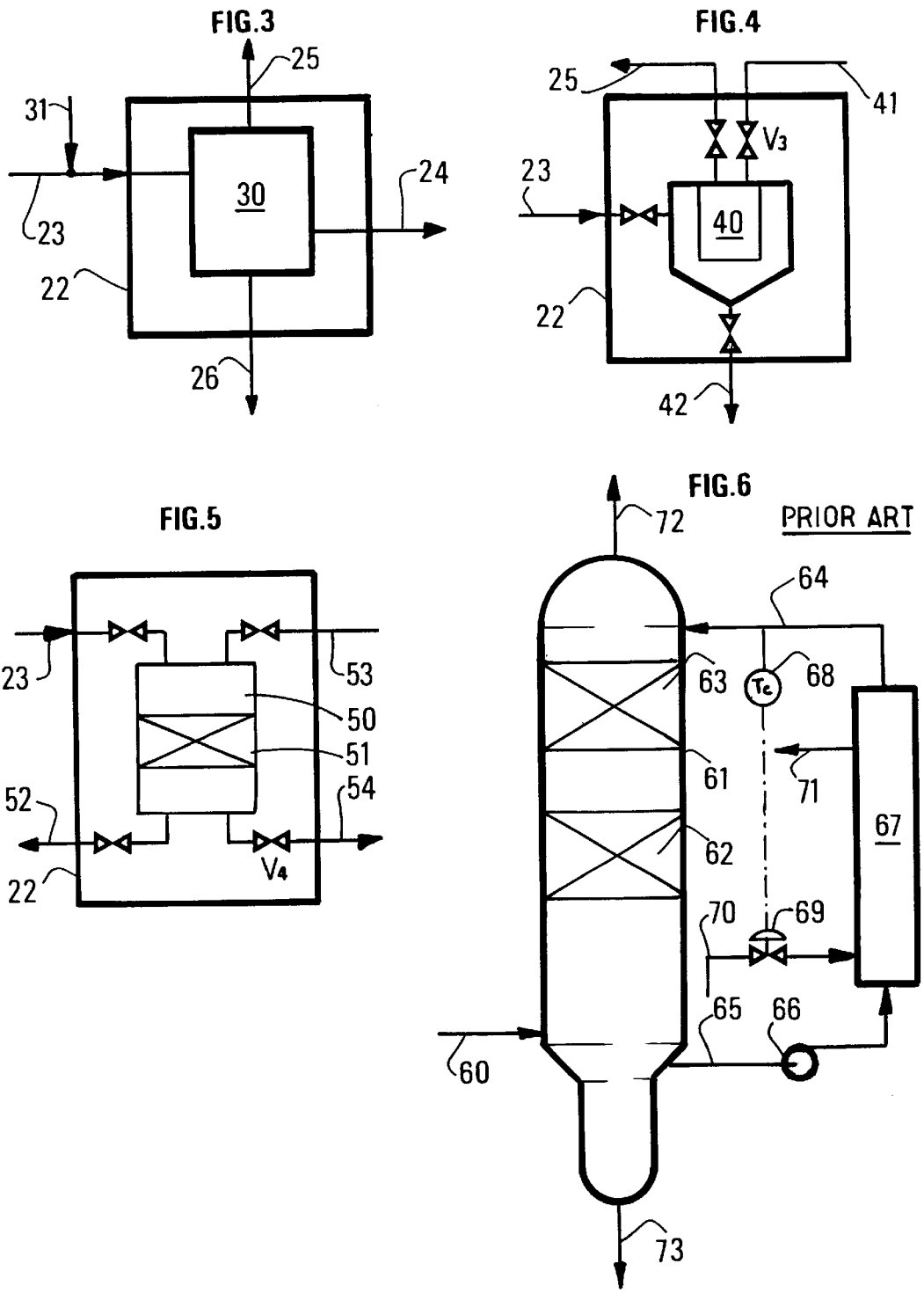

METHOD AND DEVICE FOR PROCESSING A GAS CONTAINING HYDROGEN SULFIDE AND SULFUR DIOXIDE, COMPRISING A STAGE OF REMOVAL OF SOLID BY-PRODUCTS

FIELD OF THE INVENTION

The object of the present invention is a method for processing, by means of a solvent, a gaseous effluent containing at least hydrogen sulfide and sulfur dioxide, during which by-products formed during the solvent processing method are extracted.

The method according to the invention can notably be applied in processing units used after the Claus process.

BACKGROUND OF THE INVENTION

The Claus process is widely used, notably in refineries (after hydrodesulfurization or catalytic cracking units) and for processing of natural gas, to recover elemental sulfur from gaseous feeds containing hydrogen sulfide. However, the fumes produced by Claus plants contain, even after several catalytic stages, appreciable amounts of acid gases. It is then necessary to process these Claus plant effluents (tail gas) to remove most of the toxic compounds so as to abide by antipollution standards. Since these standards become increasingly severe, it is essential to permanently improve the existing technology.

It is for example well-known to recover about 95% by weight of the sulfur present from a Claus plant.

Processing this Claus plant effluent with a Clauspol plant allows for example to reach 99.8% by weight of solvent recovered, from the exothermic Claus reaction:

$$2\ H_2S + SO_2 \rightarrow 3\ S + 2\ H_2O \quad \text{(reaction 1)}$$

Such processing requires a reaction medium consisting of an organic solvent and a catalyst comprising an alkaline or alkaline-earth salt of an organic acid. Contacting the gas to be processed and the organic solvent containing the catalyst can be carried out countercurrent or cocurrent, in a vertical or horizontal gas-liquid contactor reactor whose temperature is controlled by passage of the solvent that has been extracted at one end of the contactor reactor by a circulation pump into a heat exchanger so as to favour the highest sulfur conversion coefficient while preventing formation of solid sulfur. It is well-known that, in this type of plant, the solvent that has a limited capacity for dissolving elemental sulfur becomes loaded with free liquid elemental sulfur that can be separated from the solvent by simple decantation This liquid sulfur—solvent decantation is carried out in a liquid-liquid decantation zone that can be situated at the bottom of the contactor reactor. The sulfur is thus recovered in liquid form.

Operation of such a plant is for example described in one of the following reference books:

Y. BARTHEL, H. GRUHIER, The IFP Clauspol 1500 process: eight years of industrial experience, Chem Eng. Monogr., 10 (Large Chem. Plants), 1979, pp.69–86;

HENNICO A., BARTHEL Y., BENAYOUN D., DEZAEL C., Clauspol 300: the new IFP TGT process, For presentation at AICBE Summer National Meeting, Denver (Colo.), Aug. 14–17, 1994.

It is also well-known that the desulfurization rate of a plant of this type can be improved by desaturating the solvent in sulfur according to a process described in patent FR-2,735,460 filed by the applicant. In this case, part of the single-phase solvent and sulfur solution extracted at the end of the contactor reactor is cooled in order to crystallize the sulfur. This crystallized sulfur is then separated from the solvent by various known solid-liquid separation means such as filtration, decantation or centrifugation. A sulfur-depleted solvent that can be recycled to the contactor reactor is obtained on the one hand, and a suspension enriched in solid sulfur that can be reheated to melt the sulfur, then sent to a solvent-sulfur liquid-liquid decantation zone where the liquid sulfur is recovered is obtained on the other hand.

Although such methods prove to be very effective, they can however be limited by constraints.

For example, side reactions occur in the contactor reactor, leading to formation of solid by-products, mainly salts such as alkaline or alkaline-earth sulfates or thiosulfates, due for example to the slow degradation of the catalyst. These solids tend to accumulate and to increase in the decantation zone at the interface between the organic solvent and the liquid sulfur, which makes decantation of sulfur difficult.

One way allowing to overcome this problem is described in patent FR-2,735,460, which discloses the possibility of passing a solvent containing such salts through a filter. The salts settle on the filter, and the sulfur-containing solvent is sent to a sulfur-desaturation stage. Such processing of the circulating solvent is however not sufficient to entirely remove any accumulation of these salts at the liquid sulfur-solvent interface, including the liquid sulfur-solvent decantation zone situated downstream from the zone intended for sulfur desaturation of the solvent.

SUMMARY OF THE INVENTION

The object of the present invention is a method and its associated device wherein a liquid fraction F containing the solid by-products formed during side reactions is extracted, and this fraction is processed so as to remove said by-products and to obtain a solvent practically free of said by-products.

These by-products are for example the result of the slow degradation of the catalyst.

Extraction can be continuous or discontinuous, and accumulation of these by-products is controlled. The by-products are removed for example when this accumulation leads to sulfur decantation difficulties.

The solvent practically free of solid by-products can be advantageously recycled to the contactor reactor where the gas is processed.

The invention relates to a method for processing a gas containing at least hydrogen sulfide ($H_2S$) and at least sulfur dioxide ($SO_2$), wherein said gas is contacted, at a suitable temperature, with an organic solvent containing at least one catalyst, a gaseous effluent substantially containing no hydrogen sulfide and no sulfur dioxide any more is recovered, liquid sulfur separated from the solvent by liquid-liquid decantation.

It is characterized in that:

a layer comprising by-products is situated between the liquid sulfur and the solvent that have been separated, a liquid fraction F containing at least solid by-products is extracted from said layer, and said liquid fraction F is sent to a processing stage distinct from the contacting stage, after which at least a stream $F_1$ comprising most of the byproducts and a stream $F_2$ mostly comprising solvent nearly free of by-products are recovered.

The processing stage is for example carried out by implementing at least one of the following procedures:

a) sending an aqueous phase such as water under temperature, pressure and flow rate conditions selected to solubilize at least most of the solid by-products in said aqueous phase, and to obtain at least liquid-liquid demixing between this aqueous phase and an organic phase containing most of the solvent extracted, and/or b) carrying out at least one filtering stage, and/or c) carrying out a stage of capture, on a solid support, of the by-products so as to recover at least two phases, a phase mainly consisting of solvent depleted in solid by-products and a phase, resulting from regeneration of the capture bed, containing most of the by-products.

At least a third phase mainly consisting of sulfur is for example recovered during procedure a).

It is possible to carry out:

procedures a) or b) or c) at a temperature ranging for example between 120 and 180° C., and/or procedure a) at a pressure ranging for example between the atmospheric pressure and 1.5 MPa Procedure a) is for example carried out at a selected temperature and/or pressure so as to prevent formation of a gas phase.

The position and/or the thickness of the layer containing the solid by-products are for example controlled.

At least part of stream $F_2$ mainly consisting of solvent is for example sent to a stage of sulfur desaturation of the solvent and the sulfur-depleted solvent phase is partly or totally recycled to the contacting stage.

The method can also comprise a heating stage for favouring crystallization of the by-products formed.

The invention also relates to a device allowing to remove or to recover by-products formed during a process for treating a gaseous effluent containing at least hydrogen sulfide ($H_2S$) and sulfur dioxide ($SO_2$) wherein a solvent and a catalyst are used, said device comprising at least one contactor reactor, at least one separation zone, several lines for delivery of at least the gas to be processed and of a fluid containing a solvent and a catalyst, lines for extraction of at least a cleaned gas and of a fluid containing at least solvent and by-products.

It is characterized in that it comprises at least:

means for extracting an essentially liquid fraction F comprising at least solid by-products, said extraction means being connected to a layer of solid by-products in the separation zone, and at least one zone for processing said fraction F.

The processing zone is for example located outside the contactor reactor.

According to an embodiment, the separation zone and said extraction means are situated in the lower part of said contactor reactor.

The extraction means are for example located on a line connecting said contactor reactor and said separation zone.

The processing zone can comprise at least one of the means selected from the following means:

demixing means such as a capacity and a water delivery line, and/or filtering means, and/or capture means such as aluminas, ceramics, metal, activated charcoal, said means being suited to produce at least one stream mainly comprising solvent and at least one stream mainly comprising the by-products formed.

The device can include means ($C_{N2}$, $V_2$) for controlling the thickness and/or means ($C_{N1}$, $V_1$) for controlling the position of the layer of by-products, or control means ($V_1$, $V_2$).

It can also comprise a line allowing to recycle at least most of the solvent coming from the processing stage.

The device can also comprise means for desaturating the solvent in sulfur, these means being for example connected to the recycling line.

The contactor reactor is for example selected from one of the devices mentioned in the following list:

Reactor with random or stacked packing or static mixer SMV or impactor or hydro-jector or atomizer or wire contactor.

The method and the device according to the invention are for example applied for processing effluents from Claus plants processing the $H_2S$ coming from natural gas scrubbing operations or from crude oil refining operations.

The method and its associated device notably afford the following advantages:

they allow to simply improve existing Clauspol plants by mere addition of a small number of small-size equipments (intended for a very low flow rate) and therefore at a very low cost, they allow to recover a cleaned solvent and to recycle it directly to the gas treating process, they allow to avoid accumulation of solid by-products in the packings provided in certain contactor reactor types.

BRIEF DESCRIPTION OF THE DRAWINGS

Other features and advantages of the invention will be clear from reading the description hereafter of several embodiments of the method, with reference to the accompanying simplified and non limitative drawings wherein:

FIG. 3 shows a realisation variant where the processing zone is a demixing zone, FIG. 4 diagrammatically shows another variant where the processing zone is a filtering zone, FIG. 5 shows a processing zone where the by-products formed are separated by capture, and FIG. 6 shows a diagram from the prior art given by way of comparative example.

DETAILED DESCRIPTION OF THE INVENTION

The embodiments given hereafter by way of non limitative example relate to the removal of the solid by-products formed during processing of a gas containing at least hydrogen sulfide and sulfur dioxide. These by-products are notably due to the degradation of the catalyst used in the gas treating process.

Figure 1:
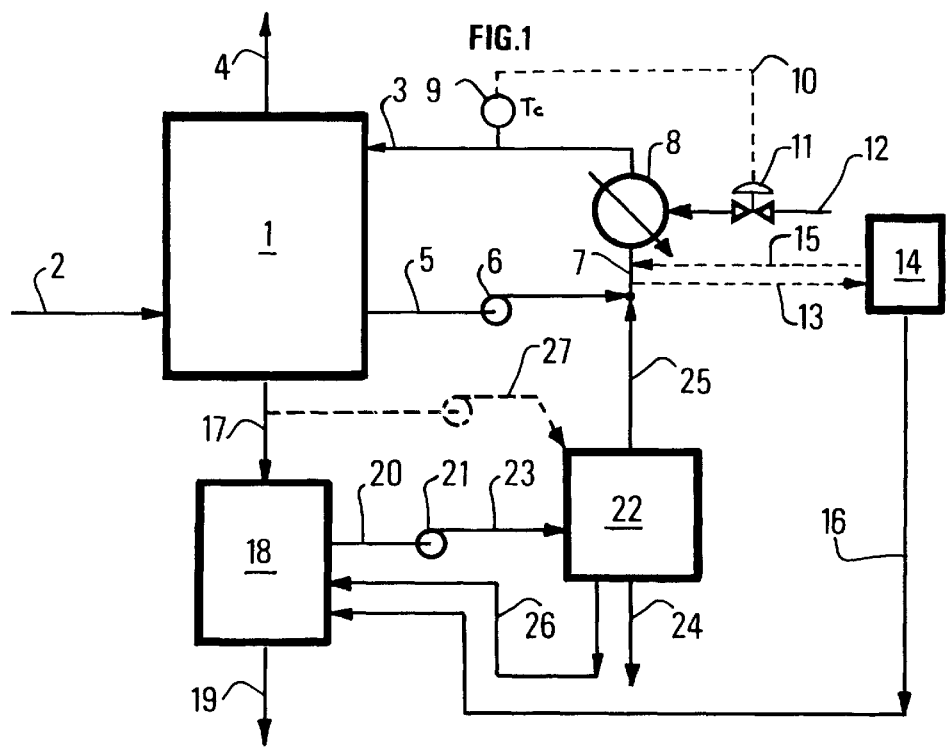
FIG. 1 is a block diagram of the various elements that constitute the device according to the invention, notably the means for extracting the by-products formed and the processing zone.

According to FIG. 1, the device comprises a gas-liquid contactor reactor 1. A line 2 supplies the contactor reactor with a sulfur-containing gas feed such as an effluent from a Claus plant and a line 3 delivers for example a recycled solution comprising a solvent such as polyethylene glycol 400 and a catalyst such as sodium salicylate.

Various solvents and catalysts selected from the list given in the description hereafter can be used without departing from the scope of the invention The cleaned gas is discharged through a line 4.

A single-phase solvent solution containing catalyst and sulfur is discharged from contactor reactor 1 through a line 5. This solution is then sent through a pump 6 and a line 7 to a heat exchanger 8 where it is cooled to a suitable temperature compatible with the operation of contactor reactor 1, 120° C. for example. This temperature can be controlled by a regulator 9 connected to heat exchanger 8 by a line 10. Line 10 is for example connected to a valve 11 provided on a line 12 delivering the coolant in the heat exchanger.

The cooled solvent from heat exchanger 8 can be recycled to contactor reactor 1 through line 3.

Part of the single-phase solvent solution circulating in the recycle loop (notably consisting of elements 5, 6, 7, 8, 3), for example 10 to 20% of the solution, is for example extracted through a line 13, from line 7, in order to be sent to a processing zone such as a sulfur-desaturation zone 14.

In this desaturation zone 14, the single-phase solution is cooled, to 60° C. for example, so as to form a suspension of sulfur crystals in the solvent. This crystallized sulfur is then separated from the solvent by various solid-liquid separation processes known to the man skilled in the art, such as filtering, decantation or centrifugation. A sulfur-depleted solvent is obtained on the one hand and extracted through a line 15 to be recycled to contactor reactor 1 for example, and a suspension enriched in solid sulfur is obtained on the other hand. The solid sulfur-enriched suspension can be reheated by suitable means for melting sulfur, known to specialists, then sent through a line 16 to a liquid-liquid decantation zone described hereafter.

The contactor reactor is for example connected by a line 17 to a decantation zone 18. This line 17 possibly allows passage of the solvent sent through line 16 into decantation zone 18.

The liquid sulfur is discharged in the lower part of this decantation zone through a line 19 provided with a valve $V_1$ for example.

The liquid fraction F containing the solid by-products formed is extracted through discharge means such as a line 20, then sent by means of a pump 21, possibly, and of a line 23 to a processing zone 22 situated outside the contactor reactor.

Line 20 and, more generally, the discharge means are situated for example level with and/or in the vicinity of a layer of by-products located between the solvent and the liquid sulfur.

Figure 2:
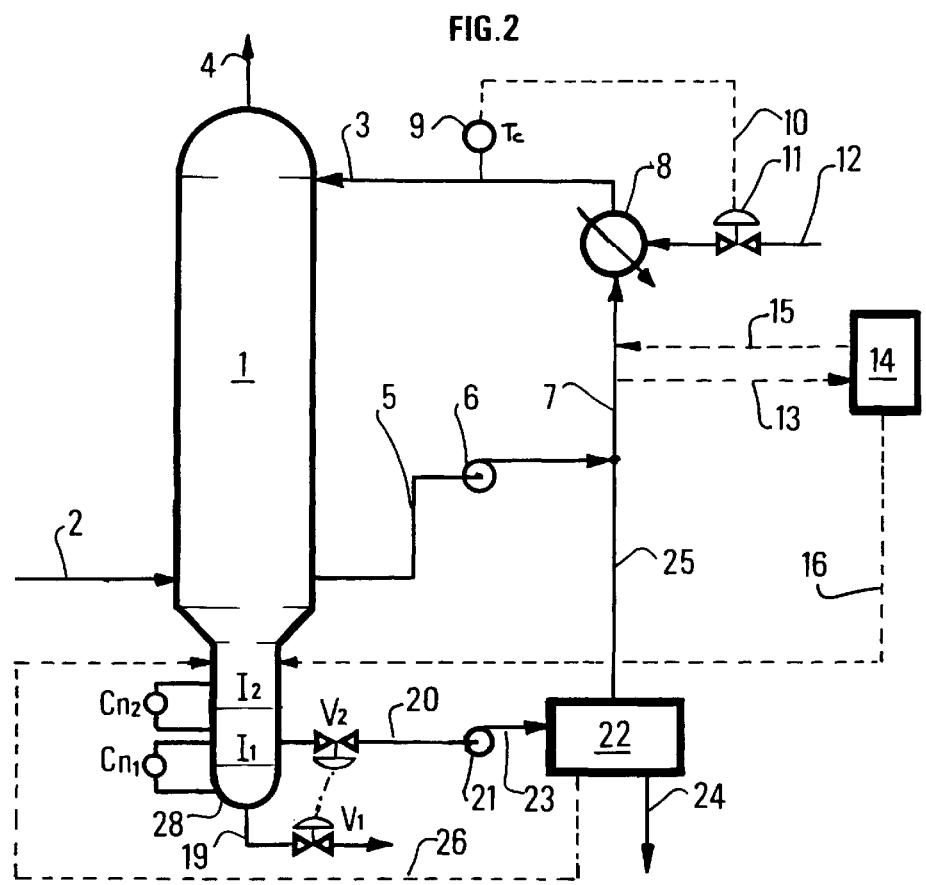
FIG. 2 illustrates a gas processing device comprising a decantation zone situated in the lower part of a contactor reactor.

Extraction means 20 can comprise various devices such as valves and lines connected to the decantation zone, certain variants of which are illustrated in FIG. 2 by way of non limitative example. Various detection modes and devices known to the man skilled in the art can be used to locate the solid by-products.

These extraction means can be operated manually or they can be connected to by-product detection means in the vicinity of the separation zone.

Processing zone 22 allows to separate liquid fraction F in order to obtain at least a stream $F_1$ comprising the solid by-products that is extracted through line 24, a stream $F_2$ mainly comprising solvent practically totally free of by-products that is recycled through line 25 to contactor reactor 1, and possibly liquid sulfur that is sent through line 26 to a decantation zone 18. Stream $F_1$ comprising the solid by-products extracted through line 24 is for example diluted in water prior to being sent to water treatment.

Without departing from the scope of the invention, the means for extracting the by-products at the interface level can be situated in the vicinity of connecting line 17 as shown by the dotted lines in FIG. 1.

FIG. 2 diagrammatically shows a realisation variant where the decantation zone is included in contactor reactor 1.

The reference numbers are the same as those used for the identical elements shown in FIG. 1.

A decantation zone 28 is situated in the lower part of contactor reactor 1.

In the vicinity of the decantation zone, liquid sulfur extraction line 19 is provided with a valve $V_1$ and solid by-products extraction line 20 is provided with a valve $V_2$. Line 20 is arranged in the vicinity of a layer formed between the liquid sulfur and the solvent for example.

Two means such as detectors $C_{N1}$ and $C_{N2}$ situated in the vicinity of this decantation zone respectively allow to detect the level of the liquid sulfur—solid by-products interface I1 and the solid by-products—solvent interface I2.

The bottom of this decantation zone comprises a layer consisting of liquid sulfur (first layer) separated, in the upper part thereof by interface I1 from a layer comprising solid by-products and solvent (second layer). This second layer is separated in the upper part thereof by interface I2 from a phase mainly consisting of solvent.

Detector $C_{N1}$ is connected by a conventional physical link to valve $V_1$ and detector $CN_2$ to valve $V_2$ in order to respectively control the position of the layer of solid by-products and its thickness in relation to extraction means 20.

Without departing from the scope of the invention, the extraction means can also comprise several lines equipped with valves allowing to control passage of the liquid fraction extracted.

The various valves can be checked manually, for example by means of visual inspection.

In the various realisation variants given in this description, the operating conditions of the process and of the device can be as follows:

The contactor reactor can be operated at a selected temperature to prevent formation of solid sulfur in the solvent, for example at a temperature ranging between 50 and 130° C., preferably between 120 and 122° C. Under such conditions, reaction (1) is displaced as much as possible to the right and the sulfur formed is in the liquid form so that it can settle at the bottom of the reactor. This temperature is for example controlled by passage of the solvent in at least one heat exchanger.

The process can be carried out within a very wide pressure range, 9.8 kPa to 4.9 MPa for example. According to an embodiment, it is carried out at the atmospheric pressure.

The process can be implemented according to any gas-liquid contacting method, for example in a vertical contactor reactor according to the following two variants:
    cocurrent contacting of the gas to be processed and of the solvent is performed. In this case, the gas to be processed and the recycled solvent laterally extracted from the lower part of the contactor reactor are fed into the top of the contactor reactor. The gaseous effluent is also laterally extracted, above the solvent to be recycled, in the lower part of the contactor reactor.

When the lower end of the contactor reactor is connected to a separating drum, the recycled solvent is recovered at the bottom of this drum and the processed gas, in the lateral part of the drum.

countercurrent contacting of the gas to be processed and of the solvent is performed. In this case, the gas to be processed is laterally fed into the lower part of the contactor reactor, the solvent coming from the lower part of the contactor reactor is laterally recycled to the upper part. The sulfur is recovered at the bottom of the contactor reactor and the gaseous effluent is discharged at the top.

The contactor reactor is shown in the various figures in a vertical position, but it can also be arranged horizontally without departing from the scope of the invention.

The contactor reactor can consist of any equipment or series of equipments allowing contacting of a gas and of a solvent containing a catalyst. It can be selected from the following list of equipments:

Reactor with random (INTALOX® saddles for example) or stacked packing MELLAPAK® packing) marketed by the Sulzer company, Static mixer SMV marketed by the Sulzer company for example, Impactor marketed by the AEA company for example, Hydro-ejector marketed by the Biotrade company for example, Atomizer marketed by the LAB company for example, Wire contactor marketed by the Toussaint Nyssenne company for example.

The solvents commonly used are mono- or poly-alkylene glycols, mono- or poly-alkylene glycol esters or mono- or poly-alkylene glycol ethers, as described in patents FR-2,115,721 (U.S. Pat. No. 3,796,796), FR-2,122,674 and FR-2,138,371 (U.S. Pat No. 3,832,454).

The catalysts used are usually those described in the aforementioned patents and more particularly alkaline salts of weak organic acids such as benzoic acid and salicylic acid.

The concentration of the catalyst in the liquid phase advantageously ranges between 0.1 and 5% by weight, more advantageously between 0.5 and 2% by weight.

Processing in zone 22 can be performed in various ways, some of which are given hereafter by way of non limitative example.

Demixing Processing

According to a vaiant illustrated in FIG. 3, with the same reference numbers relative to the elements identical to those shown in FIG. 1, the liquid fraction F dicharged through line 20 is sent through pump 21 and line 23 (FIG. 2) to a demixing processing zone 22.

The processing zone therefore comprises a capacity 30 where demixing occurs. Liquid water is injected through a line 31 that meets up with line 23 before capacity 30 for example. The water is introduced for example at a pressure of 0.3 MPa and at a temperature of 120° C.

The water dissolves the sodium sulfate and since PEG is hardly soluble in the salted aqueous phase, at least two phases appear: an aqueous phase with less than 1% PEG and, above, an organic phase with less than 5% sodium sulfate. The aqueous phase is sent through line 24 to water treatment and the PEG freed of the most part of the solid by-products is sent back to the solvent recirculation loop through line 25. A third liquid phase essentially consisting of liquid sulfur can also be present in the bottom of capacity 30. The latter is then sent through line 26 to decantation zone 18.

According to a procedure, it is possible to operate at a temperature and a pressure selected to prevent formation of a gas phase.

Filtering Processing

According to a variant illustrated in FIG. 4, processing in zone 22 is carried out by filtering.

The liquid fraction F discharged through line 20 is sent through pump 21 and line 23 (FIG. 2) to processing zone 22 comprising filtering means, for example one or more filters 40. The filter(s) consist for example of deformable cloth filter cartridges.

The solid by-products settle on the filters whereas the cleaned solvent is extracted through line 25 and recycled to the top of contactor reactor 1.

Clearing of the filters in order to eliminate the deposited by-products is performed by isolating the filter from the processing circuit and by sending into the cartridges a fluid such as filtered solvent or water, introduced under moderate pressure through a line 41. The clearing operation can be required when the thickness of the cake formed is such that the pressure difference on the filtering cartridge becomes high, for example between 0.1 and 0.3 MPa The solid by-products are extracted from the bottom of the filter through a line 42.

At least a second filter mounted parallel to the first one can be provided to ensure continuous filtering of fraction F when the first filter is being cleared.

The means allowing to isolate the zone from the rest of the processing circuit are known to the man skilled in the art and are not detailed. They notably include isolating valves $V_3$.

Capture Processing

According to a variant illustrated in FIG. 5, separation of the by-products formed is achieved in processing zone 22 by capture.

The liquid fraction F discharged through line 20 is therefore sent through pump 21 and line 23 (FIG. 2) to a processing zone 22 including a capacity 50 comprising capture means 51, for example one or more collecting beds. The beds consist of solids, for example made of ceramic, metals, oxides, activated charcoal.

The liquid fraction F fed into capacity 50 is passed through collecting bed 51 which traps the solid by-products, the solvent freed of the most part of the by-products flows out of capacity 50 through line 52 to be recycled to the contactor reactor.

When the collecting bed is saturated with solid by-products, the capacity is isolated from the circuit and the bed is regenerated by passage of clean water introduced through a line 53 and discharged through a line 54, loaded with dissolved by-products.

At least a second capacity mounted parallel to the first one can be provided to allow continuous capture of the solid by-products contained in fraction F during regeneration of the collecting beds of the first capacity by water washing for example, or during replacement of the collecting beds.

As in the case of filtering processing, the means allowing to isolate the zone from the rest of the circuit are known to the man skilled in the art and are not detailed. They notably include isolating valves $V_4$.

In all the realisation examples given above, it is possible to heat the solvent in order to favour crystallization of the by-products formed without departing from the scope of the invention.

The heating means used are known to the man skilled in the art and suited to generate a sufficient temperature favouring crystallization of the by-products formed.

The temperature ranges for example between 120 and 180° C., preferably between 120 and 150° C.

They are situated upstream from the decantation zone or in the vicinity of this zone.

For clarity reasons, the means are not shown in the figure.

The advantages obtained by means of the different variants of the process according to the invention will be clear from reading the numerical examples given hereafter.

EXAMPLE 1

Relative to a Process According to the Prior Art Illustrated in FIG. 6

A tail gas from a Claus plant is fed through a line 60, at a flow rate of 12300 Nm$^3$/h, into a vertical contactor reactor consisting of a column 61 containing two packing beds 62, 63, and it is contacted at 125° C. with an organic solvent containing a soluble catalyst introduced through a line 64.

The packing used in this example consists of 2 saddle beds ("Intalox" ceramic saddles 250 m$^2$/m$^3$ in specific surface).

The organic solvent used is a polyethylene glycol with a molecular mass of 400 and the soluble catalyst is sodium salicylate at a concentration of 100 millimoles/kg solvent.

The solvent is recycled between the bottom and the top of the contactor reactor through lines 65 and 64 at a flow rate of 500 m$^3$/h, by means of circulation pump 66 through a heat exchanger 67, temperature control and regulation being provided by a measuring and control system 68 and 69 allowing hot water to be injected at 80° C. into the exchanger through line 70 and discharged through line 71. The temperature of the recycled solvent is 125° C.

The cleaned gas flows out of the contactor reactor through line 72. The sulfur formed settles at the bottom of the contactor reactor and is extracted through line 73 at a rate of 332 kg/h.

The compositions of the gases flowing into and out of the plant are given in the table hereunder relative to the prior art illustrated in FIG. 6:

| Constituents | Incoming gas (60) % vol. | Outgoing gas (62) % vol. |
|---|---|---|
| H$_2$S | 1.234 | 0.0586 |
| SO$_2$ | 0.617 | 0.0293 |
| CO$_2$ | 4.000 | 4.038 |
| COS | 0.015 | 0.009 |
| CS$_2$ | 0.015 | 0.009 |
| S$_v$* | 0.14 | 0.03 |
| N$_2$ | 60 | 60.396 |
| H$_2$O | 34 | 35.384 |
| Sum of the sulfur compounds (counted in sulfur) | 2.036 | 0.1449 |

*S$_v$ = vapour sulfur + liquid sulfur

The sulfur compounds yield in the contactor reactor is:

$$\frac{(\% \text{ incoming sulfur compounds} - \% \text{ outgoing sulfur compounds})}{\% \text{ incoming sulfur compounds}} \times 100 = \frac{(2.036 - 0.1449)}{2.036} \times 100 = 92.88 \%$$

The total yield of the 97% yield Claus plant+Clauspol finishing plant according to the prior art is:

$$97 + \frac{(3 \times 92.88)}{100} = 99.78 \%$$

In the case where the device according to the prior art comprises a zone for desaturating the solvent in sulfur (not shown in the figures), the compositions of the incoming gas and of the outgoing gas are as follows:

| Constituents | Incoming gas % vol. | Outgoing gas % vol. |
|---|---|---|
| H$_2$S | 1.234 | 0.0247 |
| SO$_2$ | 0.617 | 0.0123 |
| CO$_2$ | 4.000 | 4.038 |
| COS | 0.015 | 0.009 |
| CS$_2$ | 0.015 | 0.009 |
| S$_v$* | 0.14 | 0.003 |
| N$_2$ | 60 | 60.396 |
| H$_2$O | 34 | 35.520 |
| Sum of the sulfur compounds (counted in sulfur) | 2.036 | 0.067 |

*S$_v$ = vapour sulfur + liquid sulfur

The sulfur compounds yield in the contactor reactor is:

$$\frac{(\% \text{ incoming sulfur compounds} - \% \text{ outgoing sulfur compounds})}{\% \text{ incoming sulfur compounds}} \times 100 = \frac{(2.036 - 0.067)}{2.036} \times 100 = 96.7 \%$$

The total yield of the 97% yield Claus plant+Clauspol finishing plant according to the prior art is:

$$97 + \frac{(3 \times 96.7)}{100} = 99.9 \%$$

It can be noted that the H$_2$S and SO$_2$ contents at the reactor outlet have greatly decreased and that the vapor sulfur content also has substantially decreased.

In the examples hereafter, the term "salt" is used to designate various by-products likely to form notably through side reactions on account of the presence of a catalyst in a gas treating process.

EXAMPLE 2

Stage of Extraction at the Interface and Separation of the By-products in a Demixing Zone (FIG. 3)

The same reactor type as in example 1 is used, which contains two ceramic Intalox saddle beds for contacting the tail gas from the Claus plant and the same solvent containing the same soluble catalyst.

The Claus tail gas is fed into the reactor through line 2 at the same flow rate (12300 Nm$^3$/h) and the solvent containing the catalyst is introduced through line 3 at a rate of 500 m$^3$/h by means of pump 6, the temperature of the solvent being maintained at 125° C. by exchanger 8 supplied with hot water by line 12. The cleaned gas flows out through line 4.

The main difference with example 1, which is the object of the invention, consists in continuously extracting a liquid fraction F at a rate of 57 l/h in the vicinity of the layer of solid by-products (second layer) in decantation zone 18, 28 and in sending it to In processing zone 22 in order to remove the solid by-products, mainly salts such as alkaline or alkaline-earth sulfates or thiosulfates due to the slow degradation of the catalyst.

In processing zone 22, liquid water at 120° C. and under a pressure of 0.3 MPa is continuously mixed with this fraction F at a rate of 6.8 l/h through line 31. This allows to recover three phases: an organic phase free of most of the salts, an aqueous phase containing about 250 g/l of dissolved salts, and possibly a sulfur phase. The organic phase is continuously sent back through line 25 into the solvent circulation loop, the aqueous phase is sent through line 24 to water processing and the sulfur is sent through line 26 into decantation zone 28 situated, for example, in the lower part of contactor reactor 1.

EXAMPLE 3

(FIG. 4)

This example differs from example 2 only in its processing zone 22, that consists here of a filter 40 with three 1-m$^2$ surface cartridges. Clearing is performed by isolating the filter from the circuit and by sending water under moderate pressure into the cartridges through line 41 when the thickness of the cake exceeds 3 mm, i.e. when the pressure difference on the filtering cartridges becomes greater than 0.2 MPa. After clearing, the salts are recovered in solution in the water at the bottom of the filter and sent to water treatment through line 42.

It is advantageous to have a second filter mounted parallel to the first one in order to allow continuous filtering of fraction F when the first filter is being cleared.

EXAMPLE 4

(FIG. 5)

This example differs from example 2 only in its processing zone 22, that consists here of a capacity 50 containing three 1-m$^3$ salt capture beds, each made of a material having a good affinity with the salts to be collected, alumina balls for example. After one month of continuous running, the pressure drop becomes higher than 0.2 MPa, which indicates that the beds are saturated with salts. The capacity is then isolated from the rest of the circuit and the capture beds are regenerated by washing with water introduced clean through line 53 and discharged loaded with salt through line 54 prior to being sent to water treatment.

It is advantageous to have a second capacity mounted parallel to the first one in order to allow continuous capture of the salts of fraction F during washing of the beds of the first capacity.

The method and the device according to the invention are particularly well-suited for processing of a gas whose acid gas content ($H_2S+SO_2$) ranges between 0.1 and 100% by volume. It is however particularly advantageous for gases with a low acid gas content ($H_2S+SO_2$) ranging for example between 0.1 and 40% by volume, more particularly between 0.5 and 5% by volume.

What is claimed is:

1. A method for processing a gas containing at least hydrogen sulfide ($H_2S$) and at least sulfur dioxide ($SO_2$), comprising:

contacting said gas with a liquid solvent containing at least one catalyst in a contacting stage;

recovering gaseous effluent substantially containing no hydrogen sulfide and no sulfur dioxide, and a mixture containing liquid sulfur, liquid solvent and solid by-products resulting from degradation of the catalyst;

separating the liquid sulfur from the liquid solvent in a decantation zone;

extracting a liquid fraction F containing at least the solid by-products from a layer between the liquid solvent and the liquid sulfur in the decantation zone;

sending said liquid fraction F to a processing stage distinct from the contacting stage; and recovering at least a stream $F_1$ comprising most of the solid by-products and a stream $F_2$ mostly comprising solvent nearly free of the solid by-products from the processing stage.

2. A method as claimed in claim 1, wherein the processing stage is carried out using at least one of the following procedures:

a) adding to said liquid fraction an aqueous phase under temperature, pressure and flow rate selected to solubilize at least most of the solid by-products in said liquid fraction and to obtain at least liquid-liquid demixing between this aqueous phase and an organic phase comprising most of the solvent extracted, b) carrying out at least one filtering stage, and c) carrying out at least one stage of capture of the by-products on a solid support so as to recover at least a phase consisting essentially of solvent depleted in solid by-products and at least a phase, resulting from regeneration of the capture bed, containing most of the by-products.

3. A method as claimed in claim 2, wherein at least a phase consisting essentially of sulfur is recovered from at least the liquid-liquid demixing during procedure a).

4. A method as claimed in claim 2, wherein:

procedures a) or b) or c) are carried out at a temperature ranging between 120 and 180° C., and/or procedure a) is carried out at a pressure ranging between atmospheric pressure and 1.5 MPa.

5. A method as claimed in claim 2, wherein the temperature and the pressure of procedure a) is selected to prevent formation of a gas phase.

6. A method as claimed in claim 1, further comprising controlling the position and/or the thickness of the layer between the liquid solvent and the liquid sulfur in the decantation zone.

7. A method as claimed in claim 1, wherein at least:

part of stream $F_2$ and/or part of the solvent separated from the liquid sulfur is recycled to the contacting stage.

8. A method as claimed in claim 7, wherein at least:

part of stream $F_2$ and/or part of the solvent separated from the liquid sulfur is subjected to a sulfur depletion step and is recycled to the contacting stage.

9. A method as claimed in claim 1, further comprising heating the solvent to crystallize the by-products.

10. The method of claim 1, wherein said gas is a Claus tail gas emitted from a Claus plant processing a hydrogen sulfide contaminated gas from either a natural gas scrubbing operation or a crude oil refining operation.

* * * * *